(12) United States Patent
Shiell et al.

(10) Patent No.: US 10,120,871 B2
(45) Date of Patent: *Nov. 6, 2018

(54) FILE SYSTEM ENABLING FAST PURGES AND FILE ACCESS

(71) Applicant: Verizon Digital Media Services Inc., Playa Vista, CA (US)

(72) Inventors: Derek Shiell, Los Angeles, CA (US); Robert J. Peters, Santa Monica, CA (US)

(73) Assignee: Verizon Digital Media Services Inc., Los Angeles, CA (US)

( * ) Notice: Subject to any disclaimer, the term of this patent is extended or adjusted under 35 U.S.C. 154(b) by 376 days.

This patent is subject to a terminal disclaimer.

(21) Appl. No.: 14/805,371

(22) Filed: Jul. 21, 2015

(65) Prior Publication Data

US 2015/0324380 A1    Nov. 12, 2015

Related U.S. Application Data

(63) Continuation of application No. 13/766,717, filed on Feb. 13, 2013, now Pat. No. 9,128,944.

(51) Int. Cl.
*G06F 7/00* (2006.01)
*G06F 17/00* (2006.01)
*G06F 17/30* (2006.01)

(52) U.S. Cl.
CPC .... *G06F 17/30117* (2013.01); *G06F 17/3007* (2013.01); *G06F 17/30091* (2013.01); *G06F 17/30106* (2013.01); *G06F 17/30221* (2013.01)

(58) Field of Classification Search
None
See application file for complete search history.

(56) References Cited

U.S. PATENT DOCUMENTS

| | | | |
|---|---|---|---|
| 4,999,766 A * | 3/1991 | Peters | G06F 17/30123 |
| 7,020,082 B2 * | 3/2006 | Bhagavath | H04L 43/00 370/230 |
| 7,062,567 B2 * | 6/2006 | Benitez | G06F 8/65 709/217 |
| 7,111,057 B1 * | 9/2006 | Sherman | G06F 17/3089 707/999.01 |

(Continued)

*Primary Examiner* — Susan Chen
(74) *Attorney, Agent, or Firm* — Ansari Katiraei LLP; Arman Katiraei; Sadiq Ansari

(57) ABSTRACT

Some embodiments provide a file system for purging content based on a single traversal of the file system that identifies the directory containing the content without performing a secondary traversal within the directory to target the operation to only the file that are associated with content such that other files contained in the directory are unaffected. The file system supplements traditional directory structures with file-level directories. Each file-level directory is created to contain a root file associated with particular content, different variants of the particular content, and supporting files. Consequently, the file system can complete an operation targeting particular content by performing that operation on the file-level directory containing the particular content, thereby eliminating the need to conduct a file-by-file traversal of the containing directory as a prerequisite to identifying the files associated with the particular content and performing the operation on the files individually.

18 Claims, 6 Drawing Sheets

(56) References Cited

U.S. PATENT DOCUMENTS

| | | | |
|---|---|---|---|
| 7,260,564 B1* | 8/2007 | Lynn | G06F 17/30876 |
| 9,003,462 B2* | 4/2015 | Walker | G06F 17/30017 |
| | | | 725/115 |
| 2005/0033777 A1* | 2/2005 | Moraes | G06F 17/30575 |
| 2011/0131184 A1* | 6/2011 | Kirshenbaum | G06F 11/1435 |
| | | | 707/639 |
| 2011/0205229 A1* | 8/2011 | Jagadev | G06F 17/30241 |
| | | | 345/428 |
| 2012/0089700 A1* | 4/2012 | Safruti | H04L 67/2842 |
| | | | 709/217 |
| 2014/0164342 A1* | 6/2014 | Liapis | G06F 17/30864 |
| | | | 707/706 |

* cited by examiner

FILE SYSTEM ENABLING FAST PURGES AND FILE ACCESS

CLAIM OF BENEFIT TO RELATED APPLICATIONS

This application is a continuation of U.S. nonprovisional patent application Ser. No. 13/766,717 entitled "File System Enabling Fast Purges and File Access", filed Feb. 13, 2013. The contents of application Ser. No. 13/766,717 are hereby incorporated by reference.

TECHNICAL FIELD

The present invention relates to file systems for storing, accessing, and managing files and more specifically, to a file system that provides efficient purging of stored files.

BACKGROUND ART

File systems almost universally rely on directory structures to track and organize stored files. The directory structure is composed of at least one root directory and various directory paths stemming from the root directory to identify the location of files on the file system. Conceptually, a particular directory path points to a particular directory that contains zero or more files and subdirectories.

Each read and write operation to the file system involves traversal of the directory structure and some finite amount of time to complete. New software techniques and hardware technology have improved the time needed to complete such operations. For instance, solid state disks are able to complete random read or write operations many times faster than a mechanical disk.

Nevertheless, further improvement and even higher performing file systems are needed for certain storage critical systems. One such system heavily reliant on file system performance is a Content Delivery Network (CDN).

A CDN deploys surrogate origin servers, also referred to as caching servers or edge servers, at various points-of-presence (PoPs) that are geographically proximate to large numbers of end users. Each PoP includes multiple caching servers. Each caching server has a finite amount of storage for locally caching content from various content providers. The cached content is then disseminated to the geographically proximate end users more expediently than would otherwise occur if the content was disseminated from a more distant or underpowered origin server of the content provider originating the cached content.

To ensure the relevance of the cached content, the caching servers continually reallocate the storage to retain the most popular content. This reallocation involves continually purging stale content and writing popular or refreshed content to the storage. Accordingly, there is a need for a highly optimized file system that can maintain pace with the amount of reads and writes performed by a caching server. Otherwise, an underperforming file system can create a bottleneck that prevents the caching server from responding to incoming requests in a timely manner.

SUMMARY OF THE INVENTION

It is an objective of the embodiments described herein to provide a file system that efficiently organizes files that are associated with similar content. It is further an objective to leverage the efficient organization of files to optimize certain file level operations. More specifically, it is an objective to complete certain operations to a particular file based on a single traversal of the file system that identifies the directory containing the particular file without performing a secondary traversal within the directory to target the operation to only the desired file or files such that other files contained in the directory are unaffected.

To achieve these and other objectives, some embodiments provide a file system that supplements traditional directory structures with file-level directories. Each file-level directory is created to contain a root file associated with particular content, different variants of the particular content produced from the root file, and supporting files, such as metadata and headers, for the root file and file variants. The file-level directory isolates the root file, variants, and supporting files associated with the particular content from files associated with other content. In so doing, the file system prevents the intermixing of different content files within a common directory. Consequently, the file system can complete an operation targeting particular content by performing that operation on the file-level directory containing the particular content, thereby eliminating the need to conduct a file-by-file traversal of the containing directory as a prerequisite to identifying the files associated with the particular content and performing the operation on the files individually.

In the context of a CDN, the file system creates the file-level directory for specific content based on the URL that is used to request that content. The terminal component of the URL can either point to a directory or a filename.

When the terminal component of the URL points to a directory, that directory is accessed by ordinary traversal of the file system. All files accessible under the specified directory will be stored within their respective file-level directories under the specified directory.

When the terminal component of the URL points to a filename, the filename is appended with an escape modifier, and the requested file is retrieved by traversing the file system according to the directory path specified in the URL and by accessing the file-level directory within the specified directory path using the filename appended with the escape modifier. If the file-level directory does not exist, one is created and the requested file is cached therein once it is retrieved from an origin server or other caching server of the CDN.

In some embodiments, the file system also provides efficient access to individual files within a file-level directory. Specifically, the file system supports direct access to a file variant, wherein the file variant is identified, in some embodiments, based on a URL and a query string parameter provided as part of the URL. To reach the file-level directory containing the file variant, the file system appends the escape modifier to the root file filename in the URL. Then to directly access the file variant within the file-level directory, the file system hashes the query string parameter to produce a filename modifier. The filename modifier is applied to the root file filename with the result specifying the name of the sought after file variant.

The file system also expedites the completion of certain file level operations relative to file systems of the prior art. For instance, a specific file can be purged by performing a single traversal of the file system to identify the file-level directory containing the specific file and by purging the file-level directory. In contrast, file systems of the prior art would perform the first traversal of the file system to identify the directory containing the specific file and would then perform a secondary traversal within the containing directory to only purge the specific file without affecting other files. By purging the entire file-level directory, the file system set forth herein avoids this secondary traversal without any adverse effects. The purge of the file-level directory purges the specific file, its variants, and any supporting files. However, this is desired behavior as all files within the file-level directory pertain to the same content such that if one file associated with the content is no longer valid, then other files are similarly invalidated.

To further expedite purge operations, some embodiments of the file system perform a delayed purge. When the purge operation is first issued, the file system identifies the file-level directory that is the target of the purge operation and the file system renames the file-level directory. This effectively prevents other resources from accessing the file-level directory and its contained files, though the directory and files still consume storage. The renaming however can be performed instantaneously, whereas physically deleting the directory and files would require significantly more time to complete. This buys the file system time to perform the physical deletion when it is under-utilized or has available cycles. This delayed purge is critical in a CDN environment because during peak hours, the file system will be occupied retrieving content in order to respond to user requests.

In some embodiments, the renamed file-level directory is batched with other file-level directories that have been renamed as a result of other purge operations. An identifier is assigned to the batch of directories and the identifier is placed in a file system queue. When the file system has available cycles, it then proceeds through the queue deleting all directories and files associated with the next identifier in the queue.

BRIEF DESCRIPTION OF THE DRAWINGS

In order to achieve a better understanding of the nature of the present invention, preferred embodiments for the enhanced file system will now be described, by way of example only, with reference to the accompanying drawings in which.

DETAILED DESCRIPTION

Figure 1:
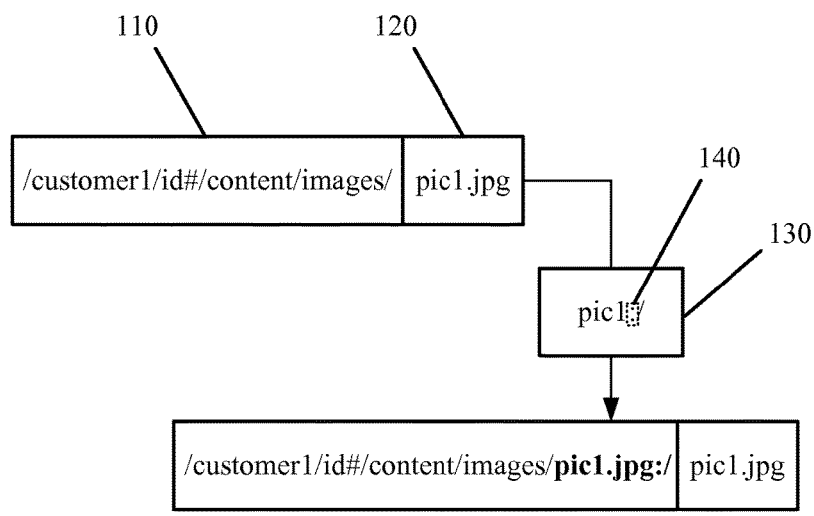
FIG. 1 illustrates file storage using the file-level directories introduced as part of the file system of some embodiments.

In the following detailed description, numerous details, examples, and embodiments for an optimized file system are set forth and described. As one skilled in the art would understand in light of the present description, the file system is not limited to the embodiments set forth, and the file system may be practiced without some of the specific details and examples discussed. Also, reference is made to the accompanying figures, which illustrate specific embodiments in which the file system can be practiced. It is to be understood that other embodiments can be used and structural changes can be made without departing from the scope of the embodiments herein described.

Some embodiments provide a file system that automatically organizes files associated with different content into different file-level directories. Each file-level directory is created to contain a "root" file associated with particular content, different variants of the root file, and supporting files, such as metadata and headers, for the root file and its variants. This organizational structure makes the root file, its variants, and its supporting files accessible after a single file system traversal identifies the containing file-level directory. More importantly, this organizational structure allows the file system to complete a specific file level operation targeting particular content by performing that operation on the file-level directory, thereby eliminating the need to conduct a file-by-file traversal of the containing directory as a prerequisite to identifying the files associated with the particular content and performing the operation on the files individually.

The proposed file system is unlike those of the prior art in which any directory can be intermixed with different files relating to different content. To perform a file level operation in a prior art file system, the file system would need to ensure that the operation being performed affects only a desired file or subset of files in the containing directory. Therefore, the prior art file system performs a first traversal (fast file system lookup) to identify the directory containing the file on which to perform an operation. The prior art file system then performs a second traversal (slow directory traversal) of the containing directory in order to individually scan each file within the directory before determining whether to apply the operation to that file. This secondary traversal may occur only when performing the operation to multiple files within the containing directory, but may also occur when performing the operation to a single file within the containing directory. In any case, the second traversal greatly slows the rate with which certain operations, such as file purging, can be performed. By eliminating this second traversal, some embodiments provide a file system that efficiently executes file level operations. Consequently, some embodiments provide a file system that is optimized for a content delivery network (CDN) in which file level operations such as purges are continually performed and such file level operations would degrade performance of the CDN caching servers if not for the optimized file system's ability to handle a large volume of these operations in the highly efficient manner described herein.

An additional complication arises in the context of the CDN. In the CDN, content may be stored on a CDN caching server's file system in its original form as a root file and variants of that same content may be created and stored in other files. File variants can be generated to produce different versions, different encodings, different resolutions, or different compressions of the root file as some examples. A customer may then issue a command to purge the content or the CDN may itself decide to purge the content when the content becomes stale. It is then up to the CDN caching server file system to purge not only the root file but also each file associated with a produced variant of the content. Each variant is identified by a different filename. Therefore to complete the purge, file systems of the prior art track the different filenames for the root file and its variants before identifying the one or more directories in which the files are located. Since the content purge involves multiple files (i.e., the root file and its variants), the prior art file systems perform the secondary traversal of the one or more containing directories in order to scan each of the identified directories file-by-file to identify the root file and its variants. Whenever any such file is identified, it is purged.

The prior art purge methodology greatly degrades the CDN caching server performance when the file-by-file analysis is conducted over a large number of files and when the CDN caching server is required to track filenames for a large number of variants. For example, a particular directory may contain a root file and file variant for a particular item of content, and 98 other files for other content. In performing the purge of the particular item of content, the prior art file system will scan all hundred files in the directory only to purge two files. In some instances, the prior art file system will scan all hundred files twice, with a first scan identifying and deleting the root file and a second scan identifying and deleting the file variant.

These and other deficiencies are overcome by using the file-level directory organizational structure introduced by the file system of the embodiments presented herein. FIG. 1 illustrates file storage using the file-level directories introduced as part of the file system of some embodiments. As shown, a directory path 110 is provided to identify where a file having filename 120 is to be stored. The file system of some embodiments appends an escape modifier 140 to the filename 120 and uses the combination to create and provide a name for the file-level directory 130 which will contain the file. The file is then stored in the file-level directory 130 which is created as a subdirectory in the directory path 110. Should the file-level directory 130 already exist under the directory path 110, the file system accesses the file-level directory 130 to perform the file storage operation without creating the file-level directory 130.

The escape modifier 140 can be appended with the just the filename, with the filename and file extension, or any variation thereof. In some embodiments, the escape modifier 140 is a colon. However, the escape modifier 140 can be any sequence of one or more alphanumeric characters. The escape modifier 140 is appended to differentiate the filename 120 from the file-level directory 130. Accordingly, the root file for any content will be retained within its own file-level directory. This prevents the intermixing of different root files in the same containing directory, thereby allowing file level operations to be performed on the file-level directories without the need to perform a file-by-file analysis of the containing directory.

The file-level directory 130 is also used to store variants of the root file. Each file variant may contain an altered filename of the root file. In some embodiments, the altered filename includes the filename of the root file with a modifier identifying the specific variant. For example, the file-level directory "pic1.jpg:/" contains the root file named "pic1.jpg" and variants "pic1_LowRes.jpg" and "pic1_HiRes.jpg". In the context of a CDN, these variants and their corresponding filenames are derived from query string parameters that are provided as part of a URL that points to the root file. Accordingly, the root filename is provided in the URL such that the file system can identify the correct file-level directory for the file variant and store the file variant therein. If the file-level directory for the file variant does not exist, one is created based on the root file filename contained in the URL. In some embodiments, the query string parameters are hashed to produce the altered filename identifying the file variant. For example, in the URL "/customer1/id#/content/images/pic1.jpg?res=1024×768" the query string parameters "?res=1024×768" for filename "pic1.jpg" can be hashed to identify the file variant "pic1_429.jpg". In the context of a CDN, the URL is provided as part of a content request received by a CDN caching server. The content request is typically encapsulated in an HTTP header such as a HTTP GET request, but can be encapsulated in any IP datagram or datagram of any other supported networking protocol.

The file-level directory 130 is also used to store supporting files for the root file and its variants. In some embodiments, the supporting files include metadata or header files providing supplemental or complimentary data for the root file and its variants. The supporting files can identify the supported variants or can track user state information in some embodiments. Each supporting file may have a filename that is derived from the filename of the root file or file variant to which it relates. As before, the root filename is used to identify and store the supporting file within the proper file-level directory.

It should be apparent that the file-level directory methodology used for file storage is also applicable to file access or file retrieval. When a file is requested with a directory path and filename, the file system appends the escape modifier to the filename to derive the file-level directory. The file system then traverses the specified directory path to the file-level directory containing the requested file. For example, a file variant named "pic1_429.jpg" can be requested based on the URL "/customer1/id#/content/images/pic1.jpg?res=1024×768", wherein the file variant filename "pic1_429.jpg" is derived from the root file filename specified in the URL ("pic1.jpg") and a hash of the URL query string parameters ("?res=1024×768"). The file system retrieves or accesses the specified file variant by constructing the path to the containing file-level directory. To do so, the file system extracts the root file filename from the URL and constructs the file-level directory "pic1.jpg:/" from the root file filename. The specified file variant can then be accessed by traversing the directory path and entering the "pic1.jpg:/" file-level directory therein.

In the description above, the root file is named according to the filename used in the URL to request that file and a file variant is named by altering the root file filename with a modifier derived from the URL query string parameter identifying the file variant. In some embodiments, the root file is renamed according to a naming convention and the renamed root file is stored to the proper file-level directory. For example, all root files may be renamed to "c" (or "c.ext", wherein ext is the file extension) such that the root files are easily identifiable in any of the file-level directories. The naming convention is also applied to the file variants and supporting files within the same file-level directory. For example, each query string variant can begin with the letter "q" and contain a modifier that is derived from a hash of the query string parameter. In some embodiments, the naming convention is used to truncate filenames and file paths specified in a URL. This may be performed when URL paths and filenames are specified in a manner that does not comply with file system limitations or to simplify storage on the file system. In such instances, the file system may hash each component of a URL path, replacing each component with its resulting hash value. For instance, each directory and subdirectory within the path "/customer1/longdirectoryname/longfilename.jpg" can be hashed to produce the truncated path "/1234/5d2z/1abh.jpg". To further truncate long URL paths, some embodiments hash an entire path to produce a single hashed value representing the path. For instance, the path "/customer1/longdirectoryname/longfilename.jpg" can be hashed to produce the truncated "5d6lx90/c.jpg". The hash will consistently reduce the same URL path to the same truncated path. Since the hashes can be computed in linear time, the time savings obtained from a simplified file system traversal often outweigh the cost to produce the truncated path, thereby expediting access times on the file system and expediting overall file system performance.

File access and retrieval using the file-level directories may also result in performance gains as the file-level directory containing the sought after file will include fewer files, thereby allowing the file system to identify the sought after file faster than if the containing directory included many hundreds or thousands of files. However, the greatest performance gains realized from using the file-level directory organizational structure come when performing file level operations, such as file purging.

As with file access or file retrieval, each operation is specified with at least a directory path and a name of one or more files to be operated on. The file system converts each filename to a file-level directory by appending the escape modifier to the filename of a root file that is associated with the file being accessed and by appending the file-level directory name to the directory path. The operation is then applied to the file-level directory. In so doing, the operation is performed on the specified file as well as any variants and supporting files contained in the file-level directory without having to traverse through the file-level directory to distinguish files that are to be operated on from files that are not to be operated on.

Figure 2:
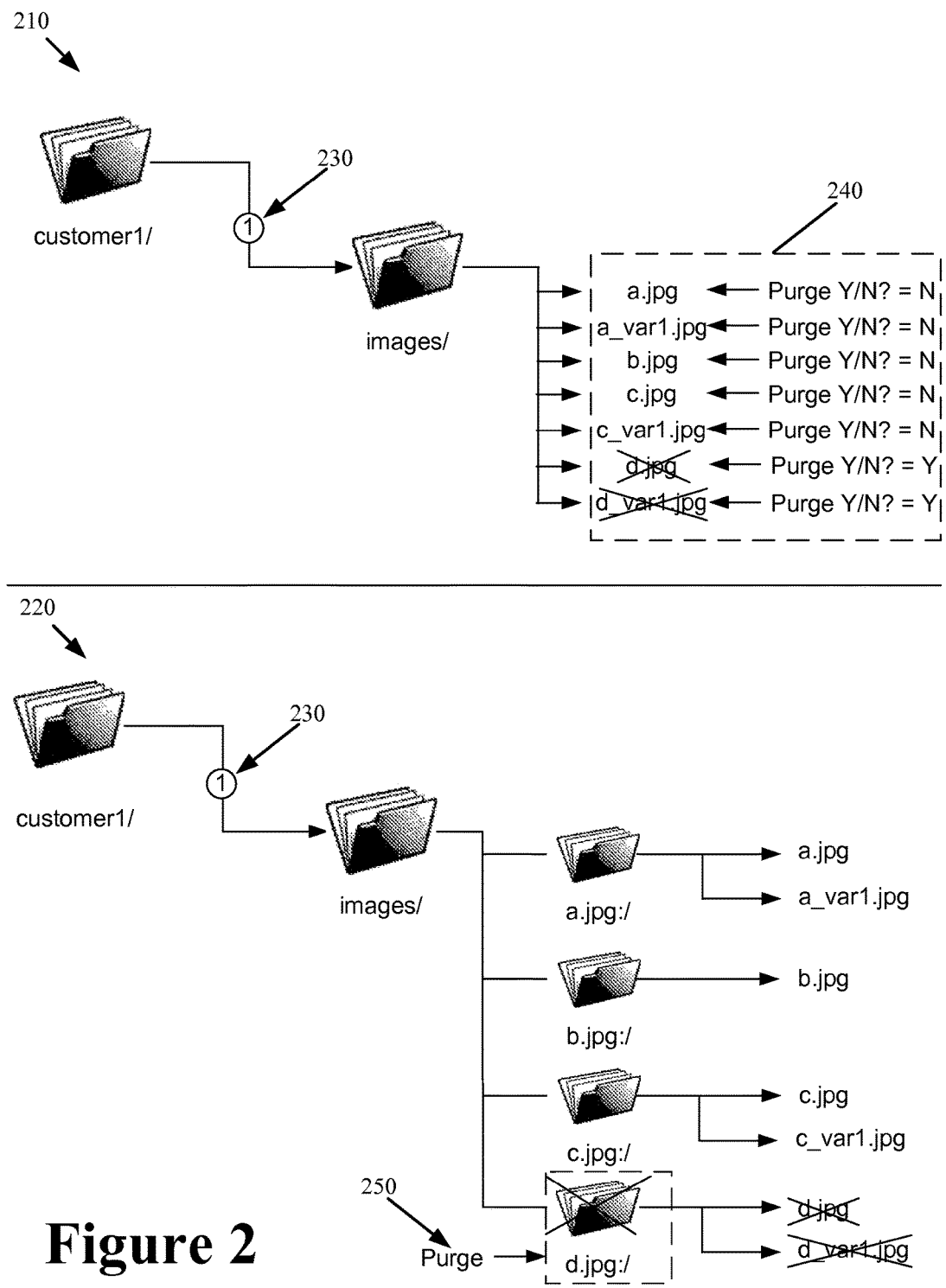
FIG. 2 conceptually illustrates how the file system of some embodiments facilitates efficient file purging relative to file systems of the prior art.

FIG. 2 conceptually illustrates how the file system of some embodiments facilitates efficient file purging relative to file systems of the prior art. To illustrate these efficiencies, the figure illustrates performing the same purge operation according to file systems of the prior art in section 210 and according to the file system of the embodiments presented herein in section 220. The purge involves removing a particular instance of content represented by the root file "/customer1/images/d.jpg" and file variant "/customer1/images/d_var1.jpg".

Each file system performs a first file system traversal 230 to reach the "/customer1/images/" directory. As shown in section 210, the prior art file systems then perform a second traversal 240 consisting of a file-by-file traversal through the "customer1/images/" directory to differentiate the "d.jpg" and "d_var1.jpg" files to be purged from other files in the directory that are not to be purged. After the second traversal 240, the "d.jpg" and "d_var1.jpg" files are identified and the file system can proceed to purge those files.

However, as shown in section 220, the second traversal is altogether avoided by the file system of some embodiments. Instead, the file system seeks the "customer1/images/d.jpg:/" directory containing only the root file "d.jpg", its variants "d_var1jpg", and its supporting files that are to be purged, wherein the "d.jpg:/" subdirectory is the file-level directory. The file system then safely purges the file-level directory "d.jpg:/" at 250. This purge removes all files associated with the particular content including the "d.jpg" and "d_var1.jpg" files without performing the second traversal or file-by-file traversal of the containing directory. Other variants or supporting files associated with the particular content are also purged as a result of purging the file-directory. This however is desired behavior in the context of a CDN. Specifically, when CDN content changes, all files associated with that content including the root file, its variants, and supporting files are no longer valid. Consequently, by purging the file-level directory, the file system of some embodiments efficiently purges all such files without performing the secondary traversal of the file-level directory or other containing directory, wherein the secondary traversal would otherwise greatly degrade the performance of the purge operation as it would necessitate a file-by-file search through the file-level directory or other containing directory for the purpose of identifying the files variants and supporting files that are to be purged.

The file system of some embodiments is particularly suited for storage critical environments. As noted above, one such environment is that of a CDN. CDN caching servers have a finite amount of storage that is continually reallocated to cache different CDN customer content. As part of the reallocation, the caching servers continually purge stale content from cache to free storage for new content. As such, performance of the caching servers is heavily reliant on the file system's ability to purge content and write content to the cache. When the caching server file system cannot efficiently complete these operations, a bottleneck will form causing delay in the caching server's ability to respond to user content requests. In other words, the caching server will be occupied purging content from cache and writing content to cache instead of serving cached content to requesting end users. Though the discussion will proceed describing application of the file system to a CDN, it should be apparent to one of ordinary skill in the art that the file system of some embodiments has general applicability and can therefore be used in a variety of personal, commercial, and enterprise environments.

Figure 3:
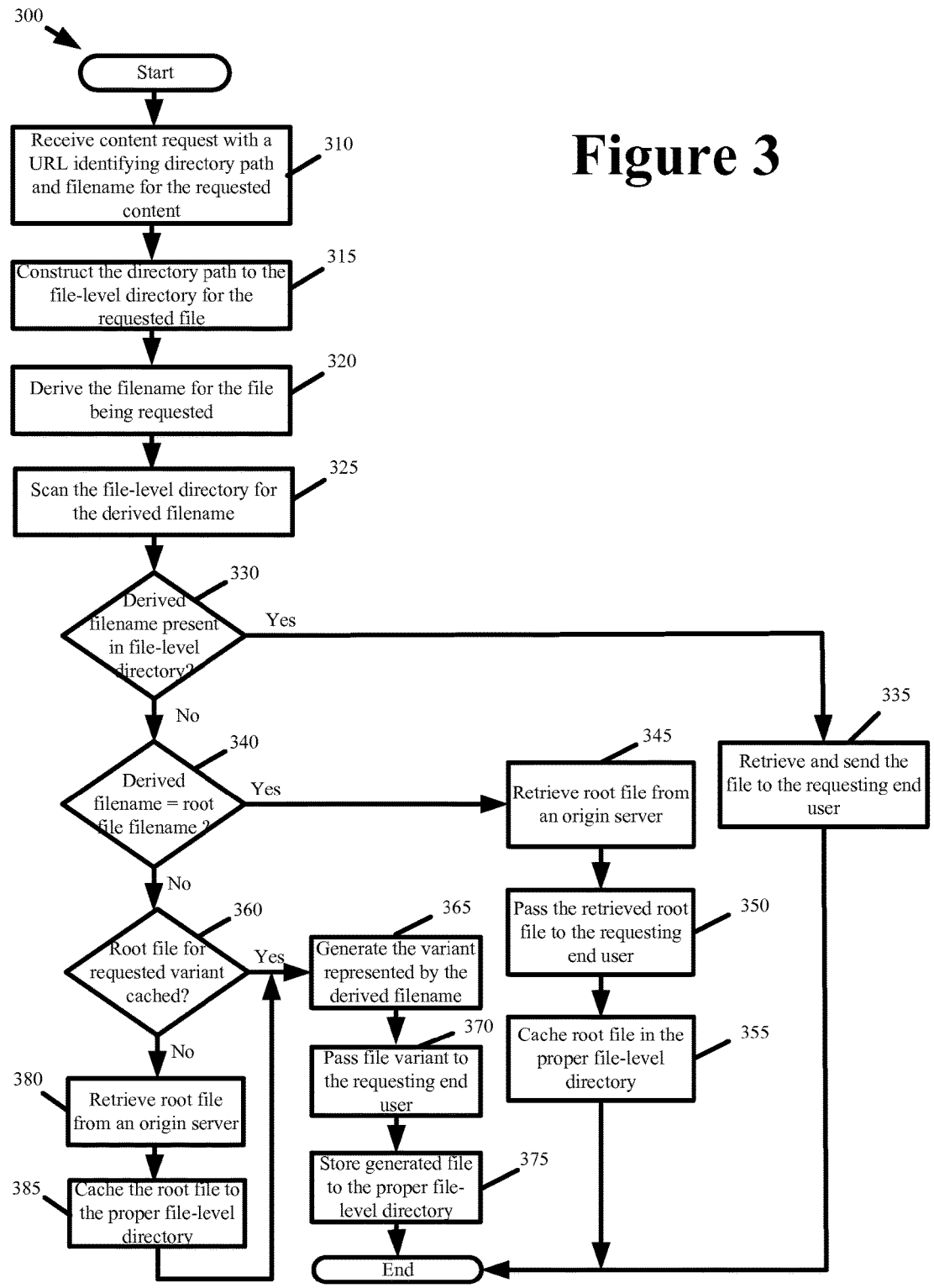
FIG. 3 presents a process for utilizing the file system of some embodiments to facilitate cache retrieval in a CDN caching server.

FIG. 3 presents a process 300 for utilizing the file system of some embodiments to facilitate cache retrieval in a CDN caching server. The process 300 commences when the CDN caching server performing the process receives (at 310) a content request from an end user. The content request specifies a URL identifying the content being requested. More specifically, the URL specifies a directory path and filename for the content being requested.

To determine whether the requested content is cached locally at the caching server, the process constructs (at 315) the directory path to the file-level directory for the requested file. Based on any query string variants provided as part of the URL, the process derives (at 320) the filename for the file being requested. Typically when the root file is requested, no query string parameters are provided. However, when a variant of the root file is requested, the process hashes the query string parameters to obtain an identifier and the process in some way combines the file variant identifier to the root file filename in order to obtain the file variant filename. As noted above, a naming convention may also be applied when deriving the filename for the file being request. The process scans (at 325) the file-level directory for the derived filename.

If the derived filename is found (at 330) in the file-level directory, the process retrieves and sends (at 335) the requested file to the end user. Otherwise, the process determines if the derived filename matches (at 340) to the filename of the root file for the requested content.

The process becomes aware that the root file is not cached when the derived filename matches to the filename of the root file and the determination at 330 reveals that the root file is not present in the file-level directory. Accordingly, the process retrieves (at 345) the root file from an origin server or another caching server, passes (at 350) the retrieved root file to the requesting end user while caching (at 355) it within the proper file-level directory applying any naming convention if applicable. If the derived filename does not match (at 340) to the filename of the root file for the requested content, the process then knows that the request is for a file variant. Accordingly, the process scans the file-level directory to determine (at 360) if the root file for the requested file variant is present.

When the root file is cached, the process generates (at 365) the variant represented by the derived filename according to the query string parameters specified in the URL. The resulting file is then passed (at 370) to the requesting end user and stored (at 375) to the file-level directory. Otherwise, the process retrieves (at 380) the root file from an origin server or other caching server. The process caches (at 385) the root file. Next, the process generates (at 365) the variant from the root file, passes (at 370) the resulting file to the requesting end user while also storing (at 375) the generated variant to the file-level directory.

Figure 4:
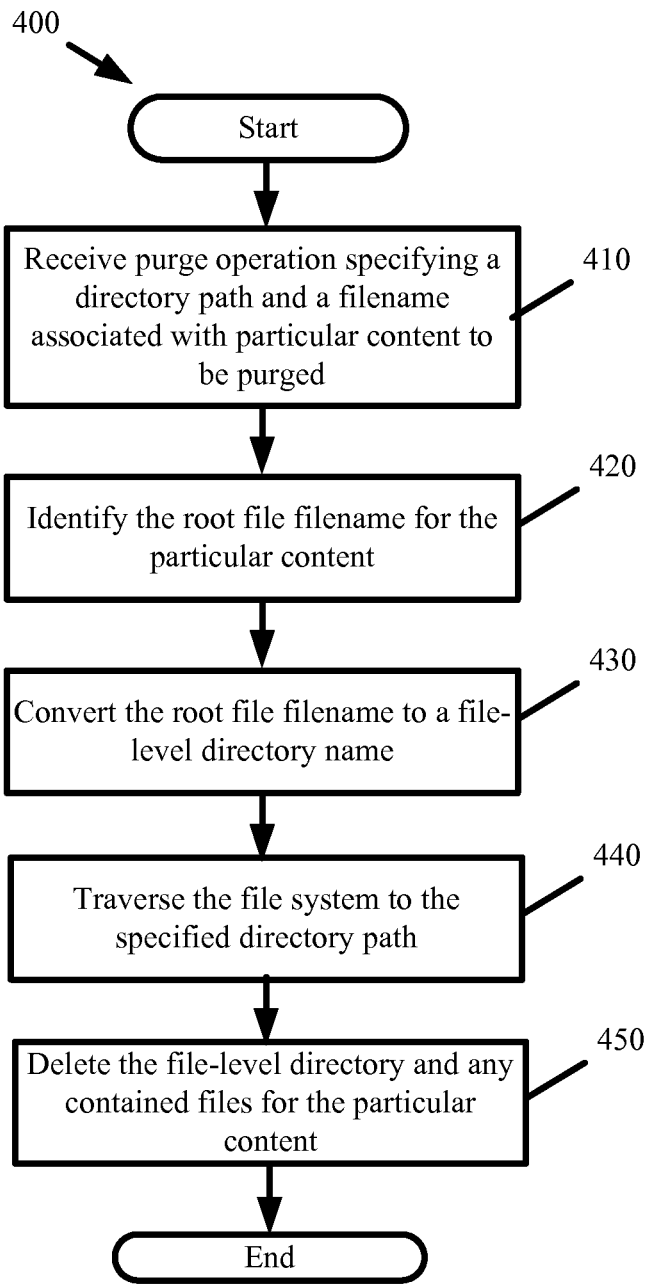
FIG. 4 presents a process for utilizing the file system of some embodiments to facilitate content purging in a CDN caching server.

FIG. 4 presents a process 400 for utilizing the file system of some embodiments to facilitate content purging in a CDN caching server. The process 400 commences when the CDN caching server performing the process 400 is issued (at 410) a purge operation to remove particular content. In the context of the CDN, the purge operation usually specifies the URL associated with the content being purged, wherein the URL specifies a directory path where the particular content is stored and a filename associated with at least the root file of the particular content. The purge operation may be issued by a CDN customer or may be automatically issued within the CDN when the particular content becomes stale. Staleness can be automatically determined from a time-to-live parameter associated with the particular content or from a lack of requests for the particular content as some example.

The process identifies (at 420) the root file filename for the particular content and converts (at 430) the root file filename to a file-level directory name. The process then traverses (at 440) the file system to the specified directory path deleting (at 450) the file-level directory and any contained files.

In the context of a CDN, it is more likely that purge operations will be issued to remove content and all its associated files. As such, CDN caching server performance is greatly improved when purging the file-level directories necessitating only the single file system traversal when compared to purging individual files from a containing directory which would otherwise introduce the additional delay necessitated by the secondary traversal of the containing directory to identify the individual files to be purged therein. It should be apparent to one of ordinary skill in the art that operations besides content purging can also be performed more efficiently when using the methodologies of the file system of some embodiments.

To further expedite purge operations, some embodiments of the file system perform a delayed purge. In some embodiments, the delayed purge comprises a two part purging of content. The first part involves instantaneously rendering the file-level directory and files associated with the content inaccessible without performing the significantly more expensive and resource intensive physical deletion of the file-level directory and any contained files. In some embodiments, the first part of the delayed purge is performed by renaming the file-level directory containing the files for the content that is to be purged. In so doing, the content is effectively purged as far as the customer or other resources of the file system are concerned since that content has disappeared from the expected paths. The renaming is done to achieve the instantaneous purging without consuming excessive resources of the file system. During peak hours, the file system is sufficiently taxed responding to content requests and writing of new content to cache. Accordingly, delaying the physical deletion allows the file system to be more responsive and available during these peak hours.

When the load lessens during off-peak hours, the file system can then perform the second part of the delayed purge. In some embodiments, the second part involves the physical deletion, wherein the file-level directory and contained files are zeroed out or pointers to those files are deleted from the file system. To more efficiently perform the second part of the delayed purge, some embodiments batch the URLs that are to be purged, assign an identifier to the batch, and place the identifier in a queue. Then, when the file system is lightly loaded, the next identifier is popped off the queue. The file system purges the content including the file-level directories and files associated with each identifier. Should the load remain light, the file system continues to pop additional identifiers off the queue and delete the content associated with each identifier.

Thus far, the efficiencies of the file system are realized from file-level operations that are performed on the file-level directories, affecting all files stored therein. However, there may be instances in which certain operations are specified to target two or more files in a file-level directory without affecting other files in the file-level directory. In some embodiments, the file system implements such granular operations by constructing a regular expression and by conducting a single pass through the containing directory using the regular expression to identify and perform the specified operation on select files.

Figure 5:
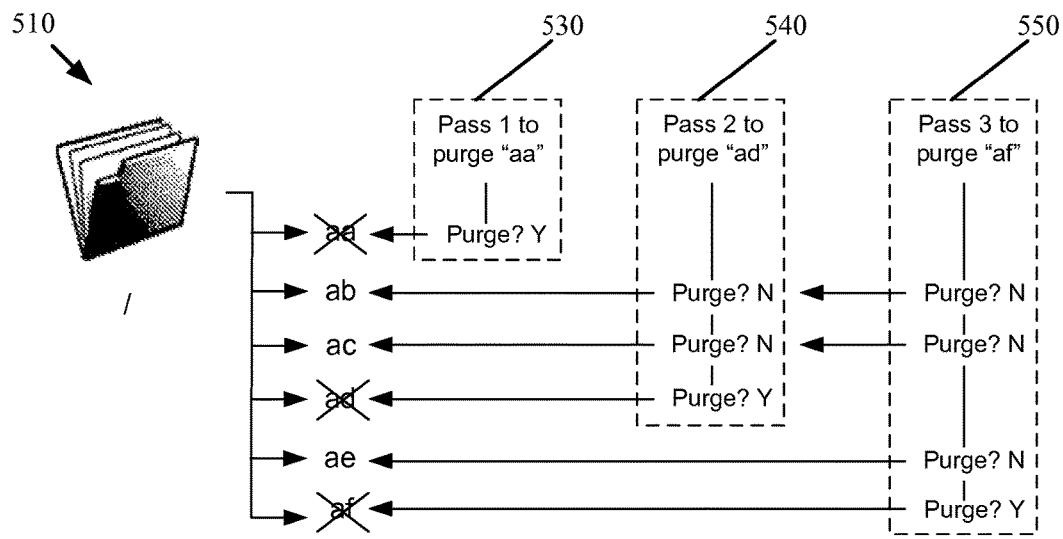
FIG. 5 illustrates the advantages of using a regular expression when targeting an operation to two or more files of a containing directory.
Figure 5:
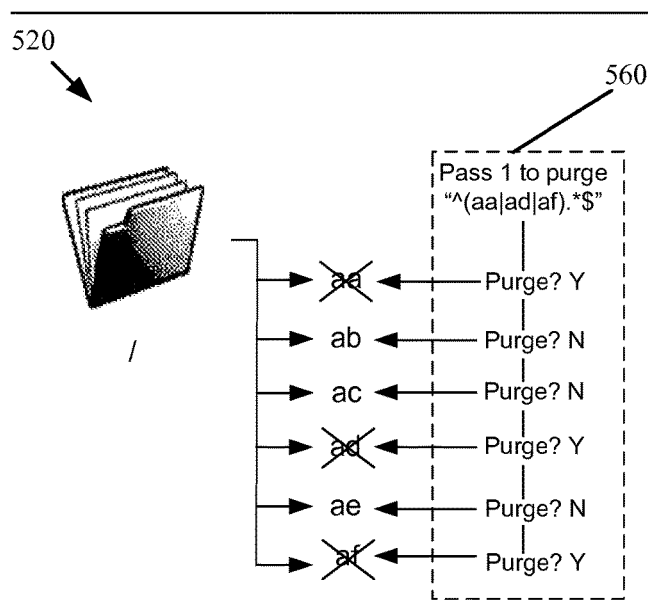

FIG. 5 illustrates the advantages of using a regular expression when targeting an operation to two or more files of a containing directory. Specifically, FIG. 5 illustrates the deletion of three files "aa", "ad", and "af" in a directory containing files "aa", "ab", "ac", "ad", "ae", and "af". The deletion is shown at 510 according to the file-by-file traversal performed by some file systems of the prior art and is shown at 520 according to the regular expression traversal of some embodiments.

As shown at 510, the file-by-file traversal involves a first pass 530 through the containing directory to identify and delete file "aa", a second pass 540 through the containing directory to identify and delete file "ad", and a third pass 550 through the containing directory to identify and delete file "ae". Each pass scans the files in the containing directory one-by-one until the desired file is found and deleted.

As shown at 520, the regular expression traversal involves a single pass 560 through the containing directory. During the directory traversal, the file system compares each file in the containing directory to the regular expression. When a match is found, the specific operation is applied to that file and the traversal continues until the sole pass is complete. The performance advantages of the regular expression traversal increase according to the number of passes that are saved.

Some embodiments provide a regular expression generator that accepts filenames of the files to be operated on as input. The generator then analyzes the filenames for commonality and based on the commonality and other pattern matching techniques, the regular expression is autonomously produced.

Efficiencies of the regular expressions can be realized when the file system performs operations on a periodic basis or at specified times. In such instances, the file system can group files that are targets of the same operation and from the group, a regular expression generator can be generated. The operation can then be performed on all files in a given directory by performing a single traversal of that directory. It should be apparent that any file system can be optimized to perform operations on multiple files using the regular expressions set forth herein irrespective of whether the file system adheres to the file-level directory organizational structure advocated herein.

The file system and many of the above-described processes are implemented as software processes that are specified as a set of instructions recorded on non-transitory computer readable storage medium (also referred to as computer readable medium). When these instructions are executed by one or more computational element(s) (such as processors or other computational elements like ASICs and FPGAs), they cause the computational element(s) to perform the actions indicated in the instructions. More specifically, when the instructions are executed, they transform a computer system with general computing resources into a specialized system that accesses and performs file operations according to the file system of some embodiments.

Server, computer system, and computing machine are meant in their broadest sense and may include any electronic device with a processor that executes instructions stored on computer readable media or that are obtained remotely over a network connection. Examples of computer readable media include, but are not limited to, CD-ROMs, flash drives, RAM chips, hard drives, EPROMs, etc. Further, wherever a server is identified as a component of the embodied invention, it is understood that the server may be a single physical machine, or a cluster of multiple physical machines performing related functions, or virtualized servers co-resident on a single physical machine, or various combinations of the above.

Figure 6:
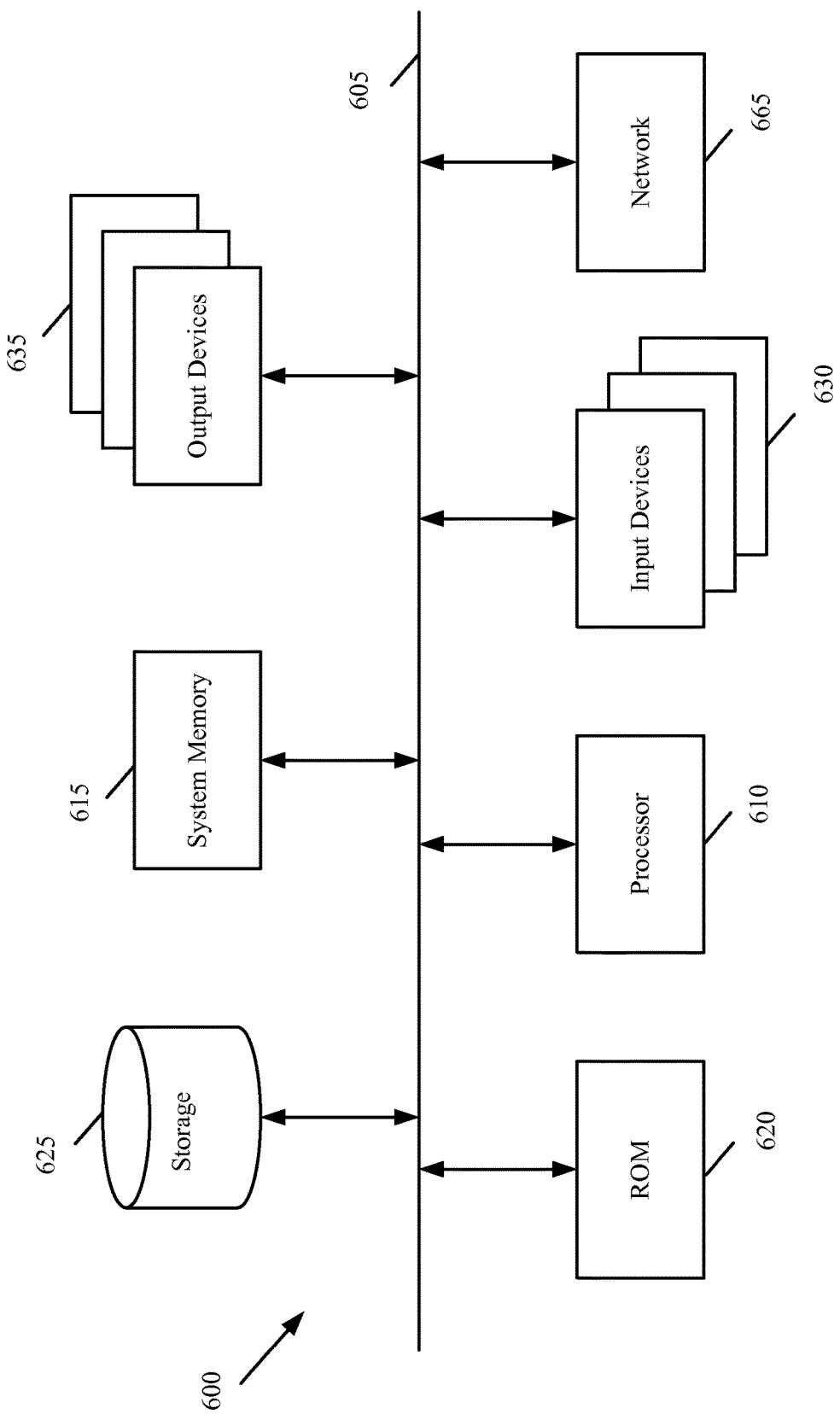
FIG. 6 illustrates a computer system or server with which some embodiments of the file system are implemented.

FIG. 6 illustrates a computer system or server with which some embodiments of the file system are implemented. Such a computer system includes various types of computer readable mediums and interfaces for various other types of computer-readable mediums that implement the processes for the enhanced file system described above. Computer system 600 includes a bus 605, a processor 610, a system memory 615, a read-only memory 620, a permanent storage device 625, input devices 630, and output devices 635.

The bus 605 collectively represents all system, peripheral, and chipset buses that communicatively connect the numerous internal devices of the computer system 600. For instance, the bus 605 communicatively connects the processor 610 with the read-only memory 620, the system memory 615, and the permanent storage device 625. From these various memory units, the processor 610 retrieves instructions to execute and data to process in order to execute the processes of the invention. The processor 610 is a processing device such as a central processing unit, integrated circuit, graphical processing unit, etc.

The read-only-memory (ROM) 620 stores static data and instructions that are needed by the processor 610 and other modules of the computer system. The permanent storage device 625, on the other hand, is a read-and-write memory device. This device is a non-volatile memory unit that stores instructions and data even when the computer system 600 is off. Some embodiments of the invention use a mass-storage device (such as a magnetic or optical disk and its corresponding disk drive) as the permanent storage device 625.

Other embodiments use a removable storage device (such as a flash drive) as the permanent storage device. Like the permanent storage device 625, the system memory 615 is a read-and-write memory device. However, unlike the storage device 625, the system memory is a volatile read-and-write memory, such as random access memory (RAM). The system memory stores some of the instructions and data that the processor needs at runtime. In some embodiments, the processes are stored in the system memory 615, the permanent storage device 625, and/or the read-only memory 620.

The bus 605 also connects to the input and output devices 630 and 635. The input devices enable the user to communicate information and select commands to the computer system. The input devices 630 include, but are not limited to, alphanumeric keypads (including physical keyboards and touchscreen keyboards) and pointing devices (also called "cursor control devices"). The input devices 630 also include audio input devices (e.g., microphones, MIDI musical instruments, etc.). The output devices 635 display images generated by the computer system. The output devices include, but are not limited to, printers and display devices, such as cathode ray tubes (CRT) or liquid crystal displays (LCD).

Finally, as shown in FIG. 6, bus 605 also couples computer 600 to a network 665 through a network adapter (not shown). In this manner, the computer can be a part of a network of computers (such as a local area network ("LAN"), a wide area network ("WAN"), or an Intranet, or a network of networks, such as the Internet.

As mentioned above, the computer system 600 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A computer-implemented method comprising:
    storing a plurality of files identified by a plurality of filenames to storage of a particular machine;
    receiving a set of purge commands at the particular machine, each purge command of the set of purge commands identifying a different file from a subset of the plurality of files to purge from storage;
    analyzing commonality in filenames for each file in the subset of files with a processor of the particular machine;
    generating based on said commonality, one regular expression inclusive of the filename of each file in the subset of files and exclusive of the filename of each file in the plurality of files not also in the subset of files;
    issuing the one regular expression in place of the set of purge commands to said storage; and
    purging the subset of files from said storage based on the one regular expression selecting each file of the subset of files in a single traversal of a file system directory storing the subset of files, wherein each command of the set of purge commands executes with a separate traversal of the file system directory.

2. The computer-implemented method of claim 1, wherein receiving the set of purge commands comprises grouping individual purge commands during a period of high demand for subsequent batch purging during a period of low demand.

3. The computer-implemented method of claim 2, wherein said issuing occurs at the period of low demand.

4. The computer-implemented method of claim 1, wherein said regular expression comprises a pattern matching to the filename of each file in the subset of files and not matching to the filename of each file in the plurality of files and not in the subset of files.

5. The computer-implemented method of claim 1, wherein the plurality of files are stored to a common file system directory, the method further comprising grouping to the set of purge commands, any purge command directed to purging any file of the plurality of files in the common file system directory.

6. The computer-implemented method of claim 1, wherein said purging comprises deleting during said single traversal of the file system directory, each file of the subset of files based on a filename matching the one regular expression.

7. The computer-implemented method of claim 1 further comprising grouping individual purge commands to the set of purge commands during an interval and issuing the one regular expression at the end of the interval.

8. The computer-implemented method of claim 1, wherein the one regular expression comprises common alphanumeric characters from the filenames of the subset of files and at least one symbol that is not in the filenames of the subset of files.

9. A computer-implemented method for performing at least a two-part delayed purging of files from a file system, the method comprising:
receiving a purge command to delete at least one file stored in a first directory path of the file system of a particular machine;
determining load on the file system exceeds a specified amount;
changing the first directory path to a different second directory path without physical deletion of the at least one file from the file system in response to the load on the file system exceeding the specified amount and further in response to said receiving the purge command to delete the at least one file stored in the first directory path;
identifying when the load on the file system does not exceed the specified amount; and
purging the second directory path from the file system of the particular machine in response to the load on the file system not exceeding the specified amount and further in response said receiving the purge command to delete the at least one file stored in the first directory path, wherein said purging comprises physical deletion of the at least one file from the file system.

10. The computer-implemented method of claim 9, wherein changing the first directory path to the different second directory path comprises renaming a directory under which the at least one file is stored.

11. The computer-implemented method of claim 9, wherein said purging comprises performing a single traversal of the file system to delete a directory in which the at least one file is stored without performing a second traversal within the directory to identify and delete the at least one file.

12. The computer-implemented method of claim 9 further comprising storing the at least one file to the first directory path, wherein said storing comprises generating in the first directory path, a subdirectory based on a name of the at least one file and storing the at least one file in said subdirectory.

13. The computer-implemented method of claim 9 further comprising monitoring the load on the file system, wherein said monitoring comprises observing resource utilization on the particular machine.

14. A computer-implemented method comprising:
receiving a storage operation identifying within a file system, a directory path as a storage location for a particular file with a particular filename;
separating storage of the particular file from other files in the directory path by creating under the directory path, a file-level directory derived from the particular filename and storing the particular file in the file-level directory rather than the directory path specified by the storage operation;
receiving an original purge operation comprising the directory path and the particular filename, said original purge operation requesting deletion of the particular file from the directory path of the file system;
producing a modified purge operation from the original purge operation by appending the file-level directory to the directory path; and
issuing to the file system, the modified purge operation with the appended file-level directory in place of the original purge operation.

15. The computer-implemented method of claim 14 further comprising performing the modified purge operation by deleting the file-level directory without traversing the file-level directory and individually deleting the particular file therein.

16. The computer-implemented method of claim 14, wherein the particular file is a first variant of first content, the method further comprising receiving a storage operation identifying within the file system, the directory path as a storage location for a different second file with a different second filename.

17. The computer-implemented method of claim 16 further comprising creating under the directory path, a different second file-level directory derived from the second filename and storing the second file in the second file-level directory rather than the directory path or the file-level directory of the particular file when the second file is a variant of different second content.

18. The computer-implemented method of claim 17 further comprising storing the second file to the file-level directory in which the particular file is stored when the second file is a different second variant of the first content.

* * * * *